United States Patent
Agarwal et al.

(10) Patent No.: US 6,833,398 B2
(45) Date of Patent: Dec. 21, 2004

(54) EPOXY RESIN-BASED AUTODEPOSITION COATINGS

(75) Inventors: Rajat K. Agarwal, Rochester Hills, MI (US); Brian D. Bammel, Rochester Hills, MI (US); William E. Fristad, Rochester Hills, MI (US); Gregg W. Rossier, Martinsville, IN (US); Elizabeth J. Siebert, Troy, MI (US); Zhiqi Yang, Troy, MI (US)

(73) Assignee: Henkel Kommanditgesellschaft auf Aktien, Dueseldorf (DE)

( * ) Notice: Subject to any disclaimer, the term of this patent is extended or adjusted under 35 U.S.C. 154(b) by 99 days.

(21) Appl. No.: 10/279,160

(22) Filed: Oct. 24, 2002

(65) Prior Publication Data

US 2003/0104212 A1 Jun. 5, 2003

Related U.S. Application Data

(63) Continuation of application No. 09/578,935, filed on May 25, 2000, now abandoned.
(60) Provisional application No. 60/136,048, filed on May 26, 1999, and provisional application No. 60/146,001, filed on Jul. 28, 1999.

(51) Int. Cl.$^7$ ............................ B32B 15/08; C08K 3/20; C08L 63/00; C08L 63/02
(52) U.S. Cl. ...................... 523/404; 428/418; 523/403; 523/414; 523/415
(58) Field of Search ........................ 428/418; 523/403, 523/414, 415; 525/524

(56) References Cited

U.S. PATENT DOCUMENTS

| | | | | |
|---|---|---|---|---|
| 3,063,877 A | * | 11/1962 | Schiffman | 148/267 |
| 3,585,084 A | * | 6/1971 | Steinbrecher et al. | 427/435 |
| 3,592,699 A | * | 7/1971 | Steinbrecher et al. | 427/435 |
| 3,647,567 A | * | 3/1972 | Schweri | 428/463 |
| 3,791,431 A | * | 2/1974 | Steinbrecher et al. | 427/435 |
| 3,795,546 A | * | 3/1974 | Hall et al. | 427/341 |
| 4,030,945 A | * | 6/1977 | Hall et al. | 428/462 |
| 4,180,603 A | * | 12/1979 | Howell, Jr. | 427/353 |
| 4,233,197 A | * | 11/1980 | Howell, Jr. | 523/416 |
| 4,289,826 A | * | 9/1981 | Howell, Jr. | 428/418 |
| 4,452,929 A | * | 6/1984 | Powers et al. | 523/403 |
| 4,636,264 A | * | 1/1987 | Schellenberg et al. | 148/265 |
| 4,636,265 A | * | 1/1987 | Fischer et al. | 148/258 |
| 5,248,559 A | * | 9/1993 | Okui et al. | 428/414 |
| 5,470,886 A | * | 11/1995 | Makhlouf et al. | 521/59 |
| 5,500,560 A | * | 3/1996 | Kano | 257/767 |
| 5,591,788 A | * | 1/1997 | Anderson et al. | 523/404 |
| 5,714,264 A | * | 2/1998 | Sacharski et al. | 428/413 |
| 5,908,902 A | * | 6/1999 | Pfeil et al. | 525/524 |
| 5,955,184 A | * | 9/1999 | Honda et al. | 428/299.4 |
| 5,981,086 A | * | 11/1999 | Siminski | 428/624 |
| 6,060,539 A | * | 5/2000 | Hermansen et al. | 523/400 |
| 6,096,806 A | * | 8/2000 | Mueller et al. | 523/402 |

FOREIGN PATENT DOCUMENTS

| | | | | |
|---|---|---|---|---|
| JP | 52102347 A | * | 8/1977 | C25D/13/06 |
| WO | WO 9304104 A1 | * | 3/1993 | C08G/59/06 |
| WO | WO 9707163 A1 | * | 2/1997 | C08L/63/00 |
| WO | WO9930841 A2 | * | 6/1999 | B05D/7/00 |
| WO | WO 9937713 A1 | * | 7/1999 | C08L/61/06 |

* cited by examiner

Primary Examiner—Robert Sellers
(74) Attorney, Agent, or Firm—Stephen D. Harper; Mary K. Cameron

(57) ABSTRACT

Autodeposited coatings useful for protecting metal surfaces and in production of rubber-to-metal composites are obtained by curing adducts based on epoxy resins which are adhered to the metal surface. One or more epoxy resins, such as for example, the combination of a diglycidyl ether of bisphenol A and a flexibilizing epoxy resin, may be prereacted to form an adduct of higher average molecular weight than the starting epoxy resins. Said adduct may then be dispersed in water, with the resulting dispersion being used in an autodeposition bath composition.

17 Claims, No Drawings

EPOXY RESIN-BASED AUTODEPOSITION COATINGS

CROSS-REFERENCE TO RELATED APPLICATIONS

This application is a continuation of U.S. application Ser. No. 09/578,935, filed May 25, 2000 now abandoned, which claims priority from U.S. application Ser. No. 60/136,048, filed May 26, 1999 and U.S. application Ser. No. 60/146,001, filed Jul. 28, 1999.

FIELD OF THE INVENTION

This invention relates to coatings for metallic substrates which are based on epoxy resins as well as to methods of preparing dispersions suitable for forming such coatings through autodeposition.

DISCUSSION OF THE RELATED ART

Over the last few decades, various water-based coatings for metallic surfaces have been developed which are commonly referred to in the field as autodeposition coatings. Such coatings utilize dispersions of resins capable of forming a protective coating when cured. The coating typically is applied by immersing the metallic surface in a bath containing the resin dispersion, acid, and an oxidizing agent to form an adherent coating that is initially wet. The thickness of the coating can be affected, for example, by such factors as total solids, pH and oxidant or accelerator concentration. Further, the coating thickness is a function of the immersion time. The initial wet coating is sufficiently adherent to remain attached to the surface on which it is formed against the influence of normal gravity and, if desired, can be rinsed before being cured (i.e., converted to a dry, solid and even more adherent coating) by heating.

A number of different resins have been proposed for use in autodeposition coatings, as described, for example, in U.S. Pat. Nos. 3,063,877; 3,585,084; 3,592,699; 3,647,567; 3,791,431; 4,030,945; 4,186,226; 3,795,546; 4,636,265; 4,636,264; and 4,800,106, each of which is incorporated herein by reference in its entirety.

Epoxy resin-based autodeposition coating systems are described in U.S. Pat. Nos. 4,233,197; 4,180,603; 4,289,826; and 5,500,460 and in International Publication Number WO 97/07163 (corresponding to U.S. Ser. No. 60/002,782, filed Aug. 16, 1995 and U.S. Ser. No. 09/011,869, filed Aug. 7, 1996), the teachings of each of which are incorporated herein by reference in their entirety. However, the epoxy resin-based autodeposition coatings developed to date generally have one or more shortcomings which have limited their usefulness, such as, for example, inconsistent coating appearance and quality.

SUMMARY OF THE INVENTION

This invention provides a metallic substrate having a coating adhered thereto, said coating being obtained by autodeposition and comprising an adduct of at least one epoxy resin which is a glycidyl ether of a first polyhydric phenol and at least one reactant containing at least one flexibilizing segment.

This invention also provides a composite comprised of the aforementioned coated metallic substrate, a rubber substrate, and an adhesive bonding said metallic substrate to said rubber substrate.

Additionally, this invention provides a method of making an aqueous dispersion suitable for use in forming an autodeposited surface coating, said method comprising a) contacting at least one epoxy resin (wherein preferably at least one epoxy resin is a flexibilizing epoxy resin) and at least one chain extender containing at least two epoxy-reactive groups such as hydroxyl, carboxylic acid, carboxylic acid anhydride, and combinations thereof for a time and at a temperature effective to accomplish reaction of said epoxy resin and chain extender to form an adduct having an increased molecular weight as compared to the epoxy resin;

b) emulsifying a solution of the adduct (and, preferably, at least one cross-linker capable of reacting with functional groups present in the adduct) in an organic solvent with water in the presence of an emulsifier to form an organic solvent-containing intermediate emulsion; and c) removing the organic solvent from the organic solvent-containing intermediate emulsion to form the aqueous dispersion.

This invention also provides an autodeposition bath composition comprising (a) at least one of the aforedescribed adducts, (b) at least one emulsifier, (c) at least one cross-linker, (d) at least one accelerator component such as acid, oxidizing agent and/or complexing agents, (e) optionally, at least one colorant, (f) optionally, at least one filler, (g) optionally, at least one coalescing agent, and (h) water.

Also furnished by this invention is a method of coating a metallic substrate comprising the steps of contacting said metallic substrate with the aforedescribed autodeposition bath composition for a sufficient time to cause the formation of a film of the dispersed adduct particles on a surface of the metallic substrate, separating the metallic substrate from contact with the autodeposition bath composition, rinsing the metallic substrate, and heating the metallic substrate to coalesce and cure the film of the dispersed adduct particles adhered to said surface.

DETAILED DESCRIPTION OF THE INVENTION

The present invention is capable of providing autodeposited coatings on metallic substrates which have improved resistance against corrosion and moisture, improved edge coverage, flow, leveling and film formation properties and reduced VOC (volatile organic compound) levels as compared to previously known autodeposition coatings.

One or more epoxy resins are utilized in the present invention. Epoxy resins are well known substances and are described, for example, in the chapter entitled "Epoxy Resins" in Volume 6 of *The Encyclopedia of Polymer Science and Engineering* (Second Edition). Preferably, at least one of the epoxy resins is a glycidyl ether of a polyhydric phenol. Such epoxy resins preferably contain approximately two epoxide groups per molecule. The polyhydric phenol may be any compound containing one or more aromatic rings and two or more hydroxy groups such as bisphenol A (a particularly preferred species of polyhydric phenol), bisphenol F, bisphenol AD, catechol, resorcinol, and the like. Preferred epoxy resins have epoxide equivalent molecular weights in the range of from about 75 to about 1000. Mixtures of different epoxy resins may also be utilized.

In one particularly desirable embodiment, at least one diglycidyl ether of bisphenol A having an epoxide equivalent weight of about 150 to about 300 is used in combination with at least one flexibilizing epoxy resin. The use of a flexibilizing epoxy resin has been found to reduce the extent of crazing observed in the coating under low humidity coating conditions. A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups ("flexibilizing segments") capable of increasing the flexibility of the cured autodeposited coating such as, for example, long aliphatic chains (e.g., polymethylene chains corresponding, for example, to the structure —$(CH_2)_n$— wherein n is preferably >3, more preferably, >6; the polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure —$((CH_2)_n$—CHR—O—$)_m$—, where n is 1–3, m is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350; such a material is available from the Cardolite Corporation of Newark, N.J., under the trademark CARDOLITE NC-514. CARDOLITE NC-513, which is believed to be epoxidized cardanol having a single epoxy group per molecule, and CARDOLITE NC-551 have also been found to be useful in the present invention. The relative ratio of bisphenol A diglycidyl ether to flexibilizing epoxy resin can be varied considerably depending upon the individual components selected and the properties desired in the final autodeposition coating. Typically, however, it will be desirable to use less flexibilizing epoxy resin than bisphenol A diglycidyl ether on an equivalents basis. For example, the ratio of flexibilizing epoxy resin: bisphenol A diglycidyl ether may suitably be from about 0.05 to about 0.40 (as calculated from the epoxide equivalent weight of each component). Typically, the flexibilizing segments will comprise from about 1 to about 25% by weight of the adduct.

Other flexibilizing epoxy resins may also be utilized such as, for example, adducts of carboxyl-terminated butadiene/acrylonitrile (CTBN) copolymers and bisphenol A diglycidyl ethers, adducts of dimeric fatty acids and bisphenol A diglycidyl ethers, and adducts of amine-terminated polyalkylene glycols and bisphenol A diglycidyl ethers, provided such adducts do not lead to stability problems.

Other methods of introducing flexibilizing segments such as polymethylene or polyoxyalkylene into the adduct of the present invention may also be employed. For example, the chain extender discussed in more detail below may contain such moieties, either in the backbone of the chain extender or pendent thereto. Alternatively, some or all of the epoxy groups of the adduct could be reacted with a compound containing one or more flexibilizing segments (e.g., a fatty acid such as pelargonic acid or a monoether of an aliphatic polyether diol). The hydroxy groups of the adduct could also be derivatized with compounds containing flexibilizing segments (for example, the hydroxy groups could be esterified with a fatty acid).

A chain extender may be utilized to react individual epoxy resin molecules through their epoxy groups so as to form an adduct which is higher in average molecular weight than the starting epoxy resin(s). For reasons that are not well understood, "pre-reacting" the epoxy resin(s) in this manner leads to synergistic improvements in the quality and performance of the final autodeposited coating as compared to simply using a dispersion of the blended epoxy resin(s) in unreacted form. This is particularly true where at least one of the epoxy resins is a flexibilizing epoxy resin. In one embodiment of the invention, the average molecular weight is increased at least 100%, more preferably at least about 200%, relative to the initial average molecular weight of the starting epoxy resin or combination of epoxy resins. The chain extender thus should contain at least two functional groups capable of reacting with said epoxy groups such as, for example, hydroxy, carboxylic acid, carboxylic acid anhydride or the like. In one embodiment of the invention, the chain extender is a polyhydric phenol such as bisphenol A. Alkoxylated polyhydric phenols such as SYNFAC 8009 (available from Milliken Chemical) may also be used as chain extenders. Suitable chain extenders additionally include dicarboxylic acids such as adipic acid.

In one embodiment of the invention a diglycidyl ether of a polyhydric phenol such as bisphenol A is used in combination with a chain extender which contains one or more flexibilizing segments such as polymethylene, polyester or polyoxyalkylene segments. For example, a polyether polyol such as polypropylene glycol, polyester polyol (hydroxy and/or carboxylic acid terminated), dimer fatty acid, long chain dicarboxylic acid (e.g., decanedioic acid), long chain diol (e.g., 1,12-decanediol), or the like could be used.

The stoichiometry of chain extender(s) to epoxy resin(s) is adjusted depending upon the degree of condensation (i.e., chain extension) desired in forming the adduct. Typically, however, the amount of epoxy resin(s) is kept in slight to moderate excess relative to the amount of chain extender(s). For example, the equivalents of epoxy groups in the epoxy resin(s) may be about 5% to about 50% greater than the equivalents of active hydrogen groups in the chain extender (s). The adduct formed thus will contain unreacted epoxy groups (i.e., the adduct will be epoxy-functionalized). Typically, the adduct will also contain hydroxy (—OH) groups, which may be present in the initial epoxy resin(s) or which may be formed as a consequence of the reaction between the chain extender and the epoxy groups of the epoxy resin.

The epoxy resin(s) and chain extender(s) are reacted for a time and at a temperature effective to cause the desired degree of condensation and chain extension. In one embodiment of the invention, for example, the epoxide equivalent weight of the adduct formed will be at least about 1000, preferably at least about 1500, as compared to epoxide equivalent weights for the starting epoxy resin reactant(s) of from about 75 to about 500. Such conditions will vary depending upon the relative reactivity of the components and other factors, but may be optimized without undue experimentation. Catalysts capable of accelerating the desired epoxy group reaction with the chain extender such as phosphines (the most preferred catalyst type), amines and other basic substances may be utilized if so desired in order to reduce the reaction time and/or temperature required. The reaction may be carried out in the presence of a solvent capable of dissolving both the epoxy resin(s) and the chain extender(s) such as, for example, an inert organic solvent (e.g., aromatic hydrocarbons, ketones). It is recognized that in certain embodiments of the invention, some fraction of the starting materials may remain unreacted. Some epoxy resin and/or chain extender thus may be present in such form when the adduct dispersion is used in an autodeposition bath.

In another embodiment of the invention, a chain extender is not utilized to form the adduct. Instead, a relatively high molecular weight epoxy resin such as a bisphenol A diglycidyl ether having an epoxide equivalent weight of about 300 to about 1000 is reacted with a monofunctional compound containing a flexibilizing segment (i.e., a compound containing both a flexibilizing segment and a single functional group capable of reacting with the epoxide and/or hydroxy groups of the epoxy resin). Examples of suitable monofunctional compounds of this type include fatty acids such as pelargonic acid and monoethers of polyalkylene glycols.

In one desirable embodiment of the invention, the adduct derived from the epoxy resin(s) and chain extender(s) is prepared prior to forming an emulsion of said adduct in water. A solution of the adduct in one or more organic solvents is emulsified with water in the presence of one or more emulsifiers to form an organic solvent-containing intermediate emulsion. The organic solvent(s) used in said emulsification step may be the same as or different from the organic solvent(s) used when reacting the epoxy resin(s) and chain extender(s). Other desired components such as cross-linkers, coalescing agents, flow control additives (levelling agents), and the like may also be incorporated into the emulsion, either as components pre-dissolved in the organic (solvent) phase or added separately to the emulsion.

Suitable cross-linkers include molecules containing at least two functional groups such as amine, amide, imine, thiol, hydroxyl, carboxyl, and carboxylic acid anhydride that are capable of chemical addition reactions with the epoxy and/or hydroxy groups present in the adduct when heated to a temperature of at least 100° C. but which are essentially non-reactive at ambient temperatures. Molecules containing at least two blocked isocyanate groups may also be used as cross-linkers. Each such isocyanate group is masked with a blocking group such as a ketoxime, urea (formed using an alcohol or phenol), uretdione, or group derived from the lactam of 6-aminohexanoic acid and/or benzotriazole, so that the blocked isocyanate group does not react at any appreciable rate at room temperature with hydroxyl groups but does react rapidly with such groups after being unblocked by heating to a temperature of at least about 100° C.

One class of suitable blocked isocyanate cross linking agents conforms to the general structure:

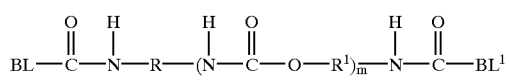

wherein each of BL and BL$^1$ independently is a monovalent moiety formed by removing the most easily ionized hydrogen atom from an amine, alcohol, amide, or oxime molecule, or BL and BL$^1$ are joined to each other to form a uretdione; each of R and R$^1$ independently is a divalent hydrocarbon or carbonyl-hydrocarbon moiety derived by removing from any hydrocarbon, or from an oxyhydrocarbon in which all oxygen atoms present are in carbonyl groups, any two hydrogen atoms not attached to the same carbon atom, said divalent hydrocarbon or carbonyl-hydrocarbon moiety having from 2 to 20 carbon atoms and having no unsaturation except aromatic and carbonyl unsaturation; and m is an integer from 0–20, preferably, with increasing preference in the order given, not more than 15, 10, 8, 6, 4, 3, 2, 1, or 0. The blocking groups BL and BL$^1$, which preferably are the same or are joined to form a uretdione, can be derived from any suitable aliphatic, cycloaliphatic, aromatic, or alkylaromatic monoalcohol, monoamide, monoamine, or monooxime. Ketoximes are especially useful when unblocking at relatively low temperatures such as 120° C. is desired, although their instability in acidic solutions may become a problem if an autodepositing composition according to the invention is to be stored for a considerable time without being used. More sterically hindered and/or more acid stable blocking groups, such as those derived from the lactam of 6-aminohexanoic acid and/or benzotriazole are preferred if unblocking is desired to begin at a substantial rate only at or above 160° C. In some instances, both types of blocking groups are used, in order to effect part of the cross-linking during an early part of the cure and part of the cross-linking during a later part of the cure. Blocking agents for isocyanates are well-known in the art, as described for example in Houben-Weyl, Methoden der Organischem Chemie (Methods of Organic Chemistry), Volume XIV/2, 4th Edition, Georg Thieme Verlag, Stuttgart, 1963, pp 61–70.

The preferred cross-linking agents as specified above are believed to be reactive with hydroxyl groups as well as with any intact epoxide groups that may be present in the relatively acidic environment of an autodeposition bath composition according to this invention, where most or all of such groups are believed likely to be hydrolyzed to produce hydroxyl groups. Furthermore, even if epoxy groups remain as such, there will normally be at least some hydroxyl groups available for cross-linking reactions such as esterification and etherification.

Suitable cross-linkers of these types are described, for example, in U.S. Pat. No. 5,500,460 and WO 97/07163. The use of isophorone diisocyanate-based, epsilon-caprolactam blocked isocyanates as cross-linkers, such as the product sold by Creanova (a Huels Group Company) under the trademark VESTAGON B1530, is particularly preferred. Other suitable blocked isocyanates which can be employed as crosslinkers include isocyanurate trimer-type blocked isocyanates, blocked isocyanates based on MDI, TDI, HDI, and IPDI, and adducts of TDI and trimethylol propane (TMP). If a blocked isocyanate-type crosslinker is utilized, the ratio of blocked isocyanate groups to hydroxy groups (NCO:OH) typically will be in the range of about 0.05 to about 1.2, more preferably about 0.1 to about 0.5.

Generally, the presence of one or more coalescing agents in the autodeposition bath compositions of this invention will be desirable in order to optimize the properties of the cured coatings obtained therefrom. Coalescing agents, for example, help to minimize the blistering or "mud-cracking" problems sometimes exhibited by autodeposited coatings. At the same time, however, it will generally be desirable for environmental and economic reasons to limit the amount of coalescing agent utilized. In certain embodiments of the invention, it is possible to omit coalescing agent(s) altogether and yet still obtain autodeposited coatings meeting all minimum criteria for commercial acceptance. The coalescing agent(s) are preferably selected from the group consisting of monoethers and monoesters of glycols. The glycols may be monomeric or oligomeric in structure. Illustrative coalescing agents include, but are not limited to, propylene glycol mono-n-butyl ether, dipropylene glycol mono-n-butyl ether, propylene glycol mono-phenol ether, tripropylene glycol monomethyl ether, and 2,2,4-trimethyl-1,3-pentanediol mono 2-ethyl propionate. Where utilized, the coalescing agents typically comprise from about 0.5 to about 10% by weight of the non-volatile components of a working autodeposition bath composition.

The emulsifier(s) used may be any of the substances capable of stabilizing the emulsion of the adduct in water and preferably are anionic surfactants such as sulfonates and sulfates. Preferred anionic surfactants are ether sulfates corresponding to the general formula MO—SO$_2$—O—(CH$_2$—CH$_2$—O)$_p$—R where M is a monovalent cation or monovalent fraction of a cation of higher valence, preferably sodium or ammonium, p is a positive integer (preferably, equal to 2 or more), and R is an alkyl or alkyl aryl moiety (preferably, an alkyl phenol moiety), preferably containing at least 8 but not more than 30 carbon atoms. The adduct is regarded as stably emulsified if no separation or segregation of bulk phases that is perceptible with normal unaided human vision occurs during storage at 25 degrees C. for at least 24 hours after preparation of the emulsion in the absence of contact of the autodeposition liquid with any substance that reacts with the autodeposition composition.

Alternatively, it is possible for the emulsifying agent to be incorporated into the adduct component of the present invention. That is, the adduct may be rendered self-emulsifying by incorporating suitable pendent functional groups.

Emulsification may be accomplished by any of the emulsification procedures known in the art. Preferably, however, the procedures described in International Publication Number WO 97/07163 (corresponding to U.S. Ser. No. 60/002,782, filed Aug. 16, 1995 and U.S. Ser. No. 09/011,869, filed Aug. 7, 1996, now U.S. Pat. No. 6,096,802, incorporated herein by reference in its entirety) are followed. These procedures involve a two stage process in which a solution of the adduct in a suitable solvent such as an aromatic hydrocarbon (especially those containing 6 to 10 carbon atoms such as toluene) and/or an aliphatic ketone (especially those containing 3 to 8 carbon atoms such as methyl isobutyl ketone) is emulsified into water to form a preliminary dispersion and the preliminary dispersion is subjected to at least one particle size refinement stage in which the preliminary dispersion is forced through a narrow aperture. The particle size distribution of the resulting emulsion preferably satisfies the following criteria: (1) the mean light scattering particle size is at least about 100 but not more than about 300 nm; (2) no more than about 1.0% of the light scattering particles volume consists of particles with a diameter greater than about 450 nm; (3) no more than about 25% of the light scattering particles volume consists of particles with a diameter larger than about 300 nm; (4) no more than about 50% of the light scattering particles volume consists of particles with a diameter larger than about 275 nm; and (5) no more than about 75% of the light scattering particles volume consists of particles with a diameter larger than about 250 nm.

Following emulsification, it will generally be desirable to remove any organic solvent(s) present by an appropriate means such as, for example, distillation. Where the adduct is a solid at 25 degrees C., solvent removal will normally result in the formation of a dispersion of solid particles of adduct dispersed in water. In other embodiments of the invention, however, the adduct (or mixtures of adduct with other components of the dispersion, such as coalescing solvent) may be liquid at 25 degrees C. The temperature during distillation should be controlled in order to avoid premature curing or cross-linking of the adduct by the cross-linker (if present). The distillation may be conducted under reduced pressure if the normal boiling point of the solvent to be removed is higher than the desired distillation temperature. Distillation may alternatively be performed at atmospheric pressure if the solvent boiling point is less than that of water. The solvent removal conditions are also preferably selected such that the organic solvent(s), but not any coalescing agent(s) which may be present, are separated from the emulsion. For this reason, it will be desirable to use a solvent which has a boiling point (or an azeotropic boiling point with water) which is lower than the boiling point(s) of the coalescing agent(s). Alternatively, the organic solvent component of the emulsion may be left in when the emulsion is used in an autodeposition coating process; any solvent remaining in the wet coating may be removed during the curing step.

The metallic substrate to be coated may be any surface or object comprised of active metal, which includes all metals and alloys more active than hydrogen in the electromotive series (i.e., a metal which is thermodynamically capable of dissolving to produce dissolved cations derived from the metal, with accompanying evolution of hydrogen gas, when contacted with an aqueous solution of a non-oxidizing acid in which the activity of hydrogen ions is 1 equivalent per liter). The present invention is particularly useful for forming protective autodeposited coatings on metal surfaces comprised of iron such as steel and the like.

To prepare a bath composition suitable for coating a metallic substrate by autodeposition, the aforedescribed dispersion is combined with an accelerator such as acid, oxidizing agent, and/or complexing agent which is capable of causing the dissolution of active metals (e.g., iron) from the surface of the metallic substrate in contact with the bath composition. The amount of adduct present in a working autodeposition bath composition is preferably in the range of from about 2 weight % to about 10 weight %. Higher adduct concentrations will generally be present in "replenisher" compositions (typically, about 4 to 6 times the concentration in the working bath composition). Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. Such accelerators are well-known in the autodeposition coating field and include, for example, hydrofluoric acid and its salts, fluorosilicic acid and its salts, fluorotitanic acid and its salts, salts comprising ferric ions, acetic acid, phosphoric acid, sulfuric acid, nitric acid, hydrogen peroxide, peroxy acids, citric acid and its salts, and tartaric acid and its salts. The pH of the bath composition preferably is in the range of from about 2 to about 4.

Preferably, the accelerator comprises the following subcomponents:

(a) a total amount of fluoride ions, which may be simple or complex fluoride ions or both, that provides a concentration thereof in the total autodeposition bath composition of at least 0.4 g/L and more preferably of, with increasing preference in the order given, at least 0.6, 0.8, 1.0, 1.2, 1.4, 1.6, 1.8, or 1.9 g/L and independently preferably provides to the autodeposition bath composition a total concentration of fluoride ions that is, with increasing preference in the order given, not more than 5, 4.5, 4.0, 3.7, 3.4, 3.1, 2.9, 2.7, 2.5, 2.3, or 2.1 g/L;

(b) an amount of dissolved trivalent iron atoms that is at least 0.003 g/L, or, with increasing preference in the order given, at least 0.007, 0.010, 0.013, 0.016, 0.019, 0.022, 0.025, or 0.027 g/L and independently preferably is, with increasing preference in the order given, not more than 0.20, 0.15, 0.11, 0.090, 0.070, 0.055, 0.0045, 0.040, 0.035, or 0.030 g/L; and (c) a source of hydrogen ions in an amount sufficient to impart to the autodeposition bath composition a pH that is at least 1.6, or preferably is, with increasing preference in the order given, at least 1.7, 1.8, 1.9, 2.0, or 2.1 and independently preferably is, with increasing preference in the order given, not more than 5, 4.5, 3.8, 3.6, 3.4, 3.2, 3.0, 2.8, 2.6, 2.4, or 2.3.

Hydrogen peroxide or an equivalent thereof may also be present in the accelerator.

It should be understood that subcomponents (a) through (c) need not all be derived from different materials. Hydrofluoric acid, in particular, is preferred as a source for both (a) and (c); ferric fluoride can supply both (a) and (b).

Independently of other preferences, an autodeposition bath composition according to the invention, when used to coat bare steel, preferably has an oxidation potential, measured by the potential of a platinum or other inert metal electrode in contact with the autodeposition bath composition, that is, with increasing preference in the order given, at least 150, 175, 200, 225, 250, 275, 290, or 300 mV more oxidizing than a SHE (standard hydrogen electrode) and independently preferably is, with increasing preference in the order given, not more than 550, 525, 500 475, 450, 425, 410, or 400 mV more oxidizing than a SHE.

The autodeposition bath composition may contain suitable flow control additives or levelling agents such as, for example, the acrylic (polyacrylate) substances known in the coatings art such as the products sold under the trademark MODAFLOW by Monsanto, as well as other levelling agents such as BYK-310 (BYK-Chemie), PERENOL F-60 (Henkel), and FLUORAD FC-430 (3M).

The autodeposition bath composition may additionally contain, if desired, pigments, fillers, or other dispersed solid phase materials, dyes or other dissolved colorants, plasticizers as well as other of the components conventionally used in the autodeposition coating field. The crosslinkers and coalescing solvents previously mentioned may, of course, be combined with the dispersion after it has been formed rather than during the emulsification process, if so desired. The relative proportions and concentrations of the various components of the autodeposition bath composition may be the same as those set forth in WO97/07163.

The epoxy resin-derived adducts described herein may be used in combination with other autodeposition resins, including, for example, unreacted epoxy resins, acrylic polymers such as those obtained by emulsion polymerization of alkyl, hydroxyalkyl and glycidyl acrylates and methacrylates, acrylic acid, methacrylic acid, acrylamides, and the like, either as homopolymers, copolymers, or copolymers with other monomers such as olefins, styrene, vinyl chloride, vinylidene chloride, and vinyl acetate. The adducts may also be utilized in combination with conventional epoxy resins such as bisphenol A diglycidyl ethers of varying molecular weight.

A coating process according to this invention comprises the steps of contacting an object with an active metal surface (preferably, one that has been thoroughly precleaned using a product such as AUTOPHORETIC 1772 cleaner, available from the Surface Technologies division of Henkel Corporation) with the aforedescribed autodeposition bath composition for a sufficient time to cause the formation of a film of the dispersed adduct particles (which may also contain certain other components of the autodeposition bath composition) of a pre-determined thickness on the metal surface, separating the coated metal surface from contact with the autodeposition bath composition, rinsing the coated metal surface to remove at least some of the absorbed but otherwise unadhered components of the bath composition from the more adherent portion of the coating and heating the rinsed surface to form a final cured, continuous film. Without wishing to be bound by theory, it is believed that when the wet adherent coating is heated, the adduct and cross-linker present in the dispersion react to form a thermoset polymeric matrix.

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality final coatings, the corrosion resistance of the cured coating may be further improved by rinsing with an aqueous solution of an alkaline earth metal compound such as calcium nitrate as described in copending application Ser. No. 09/557,534, filed Apr. 25, 2000 incorporated herein by reference in its entirety.

Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns). Final heating of the rinsed wet coated and optionally post-treated adduct film is preferably at a temperature of from about 100° C. to about 300° C., more preferably between about 130° C. and 240° C., for a time of about 3 to about 60 minutes. It may be desirable to carry out the heating in multiple stages. For example, in a first stage lasting from about 5 to about 15 minutes, the coated substrate is heated to a peak temperature of 55° C. to 65° C. to flash off most of the residual water in the coating and in a second stage lasting from about 30 to about 50 minutes, the coated substrate is heated to a peak temperature of 185° C. to 195° C.

The cured coatings obtained by practice of this invention are generally useful as protective and decorative finishes on metal objects, but are especially well suited for the production of rubber-to-metal composites. Rubber-to-metal composites are of considerable importance in many branches of industry. The bond between rubber and metal is normally achieved with the use of one or more commonly two special thermosettable compositions that serve as cements in joining the metal to the bulk rubber. To obtain the best adhesion, however, it is generally considered necessary to first treat the metal surface with a phosphating agent. Once the rubber is bonded to the phosphated metal, a final paint topcoat is normally applied so as to obtain a composite having a pleasing appearance.

The use of a pigmented autodeposited coating as a protective coating before bonding a rubber substrate to a metal surface eliminates the need to phosphate the metal surface and to apply a paint topcoat after forming the rubber-to-metal composite, resulting in a simpler, more economical process. The appearance of the autodeposited coating, which may still be visible on those areas of the metal surface not covered by the rubber substrate, is quite satisfactory for many end-use applications in industry. The presence of the autodeposited coating on the exposed areas of the metal surface not covered by the rubber substrate also provides the corrosion resistance normally required in such applications. Additionally, the adhesion of the rubber to the autodeposition coated metal surface is at least as good as the adhesion of the same rubber to a phosphate metal surface. Only one adhesive layer need be applied to create a strong and durable bond, thus resulting in further cost savings and lower VOC emulsions due to reduced adhesive usage.

The autodeposited coatings described herein have been found to be especially well-suited for use in rubber-metal composites, as they exhibit good adhesion to both metal (especially steel) and to rubber while also providing heat stability and corrosion resistance equivalent to conventional pretreatment and post paint. The manufacturing process is also greatly simplified.

Any of the rubbers (elastomers) known in the art may be utilized in such composites, such as, for example, natural rubber, nitrile rubber, styrene-butadiene rubber, butyl rubber, EPDM, diene rubber, and the like. Typically, the rubber will be vulcanizable rather than thermoplastic and will thus contain one or more of the curatives (sulfur, peroxide), accelerators, fillers, pigments, waxes, plasticizers, extenders, or the like known in the art.

The adhesive used to join the rubber to the autodeposition coated metal surface may be any of the adhesives conventionally used to adhere rubber to untreated or treated metal surfaces. The use of adhesive formulations based on halogenated polymers such as chlorinated rubber is especially desirable, although other types of adhesives such as cyanoacrylates and epoxies may also be employed. Waterborne as well as solvent-borne or heat adhesives may be used. Exemplary chlorinated rubbers include, but are not limited to, chlorinated polybutadiene, chlorinated copolymers of butadiene and styrene, and mixtures of chlorinated rubbers or hypohalogenated rubbers and the like. The polychloroprenes sold under the trademark NEOPRENE and the chlorosulfonated polyethylenes sold under the trademark HYPALON (both products of Dupont) are examples of commercially available chlorinated rubbers suitable for use in such adhesive formulations. The adhesive formulation will generally also contain one or more curatives, crosslinkers, and/or accelerators (e.g., sulfur, peroxide, nitroso and oxime compounds), fillers, solvents (organic or water), pigments (e.g., carbon black), and the like.

One method of forming such rubber-to-metal composites is to bond a vulcanized rubber to an autodeposition coated metal object which has been sprayed with, dipped in, or otherwise coated with the adhesive. Typically, the adhesive layer will be about 10 to about 50 microns thick. The coated metal object/adhesive/rubber assembly is subjected to heat (for example, temperatures between about 120° C. and 200° C.) and pressure (for example, about 50 to about 200 bar) wherein the adhesive cures and a bond between the coated metal object and the rubber is created. Alternatively, the rubber is not vulcanized prior to being brought into contact with the adhesive layer on the coated metal object; both the rubber and the adhesive are then cured (vulcanized) in the heated mold used to shape the rubber.

EXAMPLE

A. Adduct Synthesis

A resin vessel equipped with a condenser is charged with a relatively low molecular weight diglycidyl ether of bisphenol A such as DER 331 (available from Dow Chemical), a flexibilizing epoxy resin such as CARDOLITE NC-514 (available from the Cardolite Corporation), and a chain extender such as bisphenol A and the contents heated to 120° C. A catalyst such as triphenylphosphine and a solvent such as toluene are charged to an addition tank and mixed until the catalyst is dissolved. The reaction is carried out under an atmosphere of inert gas at a temperature of 120° C. to 150° C. for 4 to 5 hours. Once the contents of the reactor reach 120° C., one-half of the catalyst solution in the addition tank is added to the reactor over a period of 15 minutes. The contents of the reactor are allowed to react for approximately 1 hour. The reaction is exothermic. After 1 hour, the remainder of the catalyst solution is added over a period of 15 minutes. The reactor contents are held at 130° C. to 150° C. for an additional 2 to 5 hours. Once the desired degree of reaction has been achieved (as measured, for example, by Weight Per Epoxide titration analysis), the reactor contents are cooled to 120° C. Additional solvent (e.g., methyl isobutyl ketone) is then added and the reactor contents allowed to cool to room temperature.

The amounts of the above-described components may be as shown in the following table.

| Component | Wt., g | Wt., % | WPE[1] | Epoxy Eq. | OH Eq. |
|---|---|---|---|---|---|
| Cardolite NC-514 Epoxy Resin | 38.25 | 8.46 | 350 | 0.1093 | |
| Bisphenol A Chain Extender | 73.86 | 16.34 | | | 0.6470 |
| DER 331 Epoxy Resin (1$^{st}$ Charge) | 88.46 | 19.57 | 187 | 0.4730 | 0.0233 |
| Toluene (1$^{st}$ Charge) | 5.62 | 1.24 | | | |
| Triphenyl Phosphine (catalyst) | 0.39 | 0.09 | | | |
| DER 331 Epoxy Resin (2$^{nd}$ Charge) | 54.43 | 12.04 | 187 | 0.2911 | 0.0144 |
| Toluene (2$^{nd}$ charge) | 7.16 | 1.58 | | | |
| Triphenyl Phosphine | 0.50 | 0.11 | | | |
| Methyl Isobutyl Ketone | 183.29 | 40.55 | | | |
| Total | 451.96 | 100 | | 0.8734 | 0.6847 |

[1]WPE = weight per epoxide

B. Processing of Adduct into Emulsion

A first reaction vessel equipped with a mixer is charged with deionized water and a surfactant such as RHODAPEX CO 436 (containing 58% of an ammonium salt of sulfonated nonylphenol ethoxylate) and the contents mixed slowly for 20 minutes or until homogeneous. A second reaction vessel equipped with a heavy-duty stirrer, heating and cooling means, and vacuum distillation capability is charged with a solvent such as methyl isobutyl ketone under an inert gas atmosphere. After turning on the stirrer, the adduct synthesized as described in A above, a cross-linker such as VESTAGON B1530, optionally, a coalescing solvent such as TEXANOL, and, optionally, other additives (e.g., MODAFLOW 2100 levelling agent) are charged to the second reaction vessel. The resulting mixture is heated at approximately 35° C. for about 1 hour until all the components are dissolved and the mixture is homogeneous.

In a commercial operation, the contents of the two reaction vessels may be pumped, according to their proportions, through an in-line rotor stator emulsifier and into a holding tank to form a pre-emulsion. When carrying out the invention on a smaller (laboratory) scale, the water/surfactant mixture may simply be added to the solvent/adduct/cross linker mixture under mixing according to their proportions. The pre-emulsion is then fed using a continuous duty 2 gallons/minute 80 psi discharge feed pump into a MICROFLUIDIZER dispersing apparatus equipped with a heat exchanger (minimum 4 square feet exchange area) capable of cooling 8.8 liters/minute below 35° C. (the heat exchanger is not necessary for laboratory scale operation). The average particle size of the emulsion formed is preferably in the range of 150 to 250 nm. The emulsion is then pumped into a clean dry distillation vessel.

For distillation, the vessel can be filled to approximately 70% capacity. The contents of the vessel are heated to 38° C. (+/−2° C.). The vacuum applied should be sufficient to keep the distillation rate approximately constant. The emulsion temperature should not exceed about 40° C. Distillation is continued until all of the solvent has been removed (with certain solvents such as methyl isobutyl ketone, an azeotrope with water will be removed). A pigment dispersion such as AQUABLACK 255A carbon black in water is added to the stripped emulsion and mixed thoroughly until homogeneous. The solids (non-volatiles) level is then adjusted to approximately 38% using deionized water. The resulting dispersion may be used as an autodeposition replenisher or, alternatively, as a component of the autodeposition bath composition described in C below.

The amounts of the above-described components may be as shown in the following table.

| Component | Wt., g | Wt., % |
|---|---|---|
| Adduct Solution (60% Non-Volatile)[1] | 425.35 | 22.79 |
| VESTAGON B1530 Cross-Linker[2] | 45.00 | 2.41 |
| MODAFLOW 2100 Levelling Agent | 15.00 | 0.80 |
| TEXANOL Coalescing Agent | 34.80 | 1.86 |
| Methyl Isobutyl Ketone | 330.00 | 17.68 |
| RHODAPEX CO436 Surfactant | 16.29 | 0.87 |
| Deionized Water | 1,000.00 | 53.58 |
| Total | 1,866.44 | 100 |

[1]The non-volatile (solids) component has a weight per epoxide of 1741 and an —OH equivalent weight of 372, thus providing 0.1465 epoxy equivalents and 0.6855 —OH equivalents.
[2]Containing the equivalent of 15.25 wt % NCO, thus providing 0.1634 NCO equivalents.

C. Preparation of Autodeposition Bath Composition

Deionized water (450 g per 1000 g of the final bath composition) is added to a container so as to fill approximately one-half of the container. AUTOPHORETIC 300 starter (available from Henkel Surface Technologies) is then added in an amount corresponding to 50 g per 1000 g of the final bath composition and mixed thoroughly. An amount of the dispersion obtained as described in Section B above sufficient to provide a solids level of 6% in the final bath composition is then added while mixing thoroughly, taking care not to generate foam. Finally, sufficient water is added to bring the volume of the bath composition up to the desired operating level.

D. Metal Panel Coating

Metal panels (e.g., cold rolled steel) are coated by placing said panels (which may desirably be pre-cleaned using standard cleaning methods known in the autodeposition art) in the autodeposition bath composition described in C above for about 90 seconds at a temperature of about 21 to 24 degrees C., after allowing the bath to equilibrate for 24 hours first. The redox value of the bath composition is maintained in the range of from 300 to 400 mV by addition of aqueous hydrogen peroxide or the like. Free fluoride ion activity is monitored using a LINEGUARD 101 meter and associated free fluoride sensitive electrode and maintained in the range of from 150 to 300 microamperes by addition of aqueous hydrofluoric acid or the like. Additional quantities of the dispersion obtained in C above are added as needed to maintain a solids level of 5.5 to 6.5%. Following the coating step, the panels are rinsed for 1 minute using a desired rinse solution (e.g., deionized water alone at ambient temperature or a 1.5 wt % solution of calcium nitrate in water at 50 degrees C.) and then cured by baking in an oven for up to about 1 hour at 185 degrees C., for example.

What is claimed is:

1. An autodeposition composition comprising the following components
   (A) water;
   (B) an adduct which is the reaction product of
      (1) one or more reactants comprising an epoxy resin of a glycidyl ether of bisphenol A,
      (2) one or more reactants comprising an epoxy resin of a glycidyl ether of cardanol and a chain extender comprising bisphenol A, or one or more reactants comprising a monofunctional compound selected from the group consisting of fatty acids and monoethers of polyalkylene glycols;
   (C) one or more emulsifying agents in sufficient quantity to disperse component (B) so that no separation or segregation of bulk phases that is perceptible with the normal unaided human vision occurs during storage at 25° C. for at least 24 hours after preparation of the autodeposition composition, in the absence of contact of the autodeposition liquid with any substance that reacts with the autodeposition composition;
   (D) one or more dissolved accelerator agents selected from the group consisting of acids, oxidizing agents and complexing agents, sufficient in strength and amount to impart to the autodeposition composition an oxidation-reduction potential that is at least 100 mV more oxidizing than a standard hydrogen electrode; and
   (E) a cross-linker comprising at least one blocked isocyanate cross-linker.

2. An autodeposition composition according to claim 1 wherein, in component (B), the one or more reactants comprising an epoxy resin of a glycidyl ether of bisphenol A have an epoxide equivalent weight of 150 to 300 and are reacted with one or more reactants comprising an epoxy resin of a glycidyl ether of cardanol and a further reactant comprising bisphenol A.

3. An autodeposition composition according to claim 1 wherein, in component (B), the one or more reactants comprising an epoxy resin of a glycidyl ether of bisphenol A have an epoxide equivalent weight of 300 to 1000 and are reacted with the one or more reactants comprising a monofunctional compound selected from the group consisting of fatty acids and monoethers of polyalkylene glycols.

4. An autodeposition composition according to claim 3 wherein the monofunctional compound is a fatty acid.

5. An autodeposition composition according to claim 4 wherein the fatty acid is pelargonic acid.

6. An autodeposition composition according to claim 1 wherein at least one emulsifying agent of component (C) is an anionic sulfate or sulfonate surfactant.

7. An autodeposition composition according to claim 1 wherein the accelerator component (D) comprises one or more accelerator agents selected from hydrofluoric acid and its salts, fluorosilicic acid and its salts, fluorotitanic acid and its salts, salts comprising ferric ions, acetic acid, phosphoric acid, sulfuric acid, nitric acid, hydrogen peroxide, peroxy acids, citric acid and its salts, and tartaric acid and its salts.

8. An autodeposition composition according to claim 1 wherein the at least one blocked isocyanate cross-linker of component (E) comprises one or more diisocyanate-based, epsilon-caprolactam blocked isocyanate cross-linkers.

9. An autodeposition composition according to claim 1 wherein the adduct comprising component (B) is formed prior to forming an emulsion of said adduct in water.

10. An autodeposition composition according to claim 1 in the form of an aqueous dispersion wherein the average particle size is from 100 nm to 300 nm.

11. An autodeposition composition comprising the following components:
   (A) water;
   (B) an adduct which is the reaction product of
      (1) one or more reactants comprising an epoxy resin of a glycidyl ether of bisphenol A,
      (2) one or more reactants comprising an epoxy resin of a glycidyl ether of cardanol and a chain extender comprising bisphenol A;
   (C) one or more emulsifying agents;
   (D) one or more dissolved accelerator agents selected from the group consisting of acids, oxidizing agents and complexing agents, sufficient in strength and amount to impart to the autodeposition composition an oxidation-reduction potential that is at least 100 mV more oxidizing than a standard hydrogen electrode; and
   (E) a cross-linker comprising at least one epsilon-caprolactam blocked isocyanate cross-linker.

12. An autodeposition composition according to claim 11 wherein, in component (B) of the autodeposition composition, the one or more reactants comprising an epoxy resin of a glycidyl ether at bisphenol A have an epoxide equivalent weight of 150 to 300 and are reacted with one or more reactants comprising an epoxy resin of a glycidyl ether of cardanol and a further reactant comprising bisphenol A.

13. An autodeposition composition according to claim 11 wherein at least one emulsifying agent of component (C) of said autodeposition composition is an anionic sulfate or sulfonate surfactant.

14. An autodeposition composition according to claim 11 wherein the accelerator component (I) of said autodeposition composition comprises one or more accelerator agents selected from the group consisting of acids, oxidizing agents and complexing agents, sufficient in strength and amount to impart to the autodeposition composition an oxidation-reduction potential that is at least 100 mV more oxidizing than a standard hydrogen electrode.

15. An autodeposition composition according to claim 11 wherein the accelerator component (D) of said autodeposition composition comprises one or more accelerator agents selected from hydrofluoric acid and its salts, fluorosilicic acid and its salts, fluorotitanic acid and its salts, salts comprising ferric ions, acetic acid, phosphoric acid, sulfuric acid, nitric acid, hydrogen peroxide, peroxy acids, citric acid and its salts, and tartaric acid and its salts.

16. An autodeposition composition according to claim 11 wherein the adduct comprising component (B) is formed prior to forming an emulsion of said adduct in water.

17. An autodeposition composition according to claim 11 in the form of an aqueous dispersion wherein the average particle size is from 100 nm to 300 nm.

* * * * *